Aug. 10, 1943.   G. WALTER   2,326,268
ADJUSTABLE SHAFT BEARING
Filed March 25, 1943
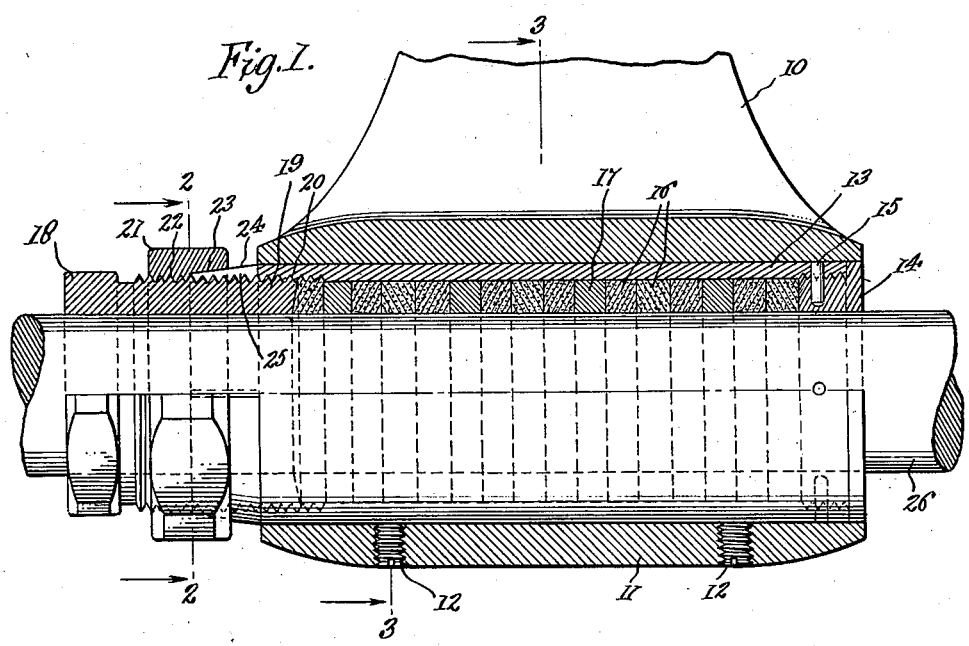
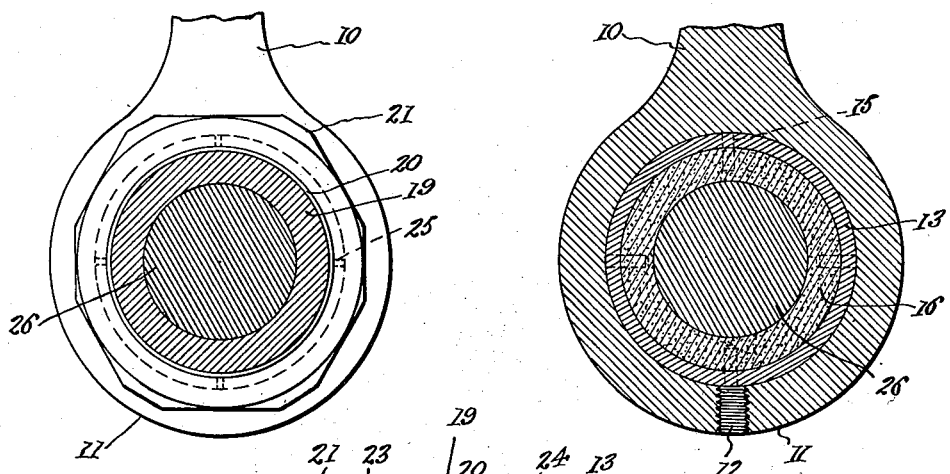
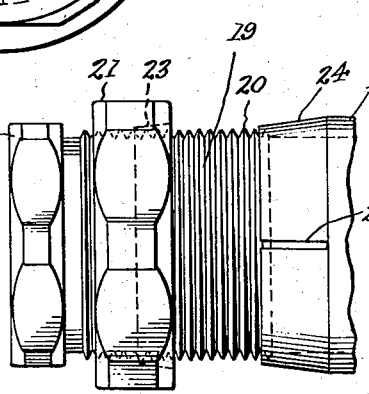
Inventor
Gustave Walter
by Mawhinney & Mawhinney
Attorneys Patented Aug. 10, 1943

2,326,268

UNITED STATES PATENT OFFICE 2,326,268

ADJUSTABLE SHAFT BEARING

Gustave Walter, Jersey City, N. J.

Application March 25, 1943, Serial No. 480,527

3 Claims. (Cl. 308—36.1)

The present invention relates to improvements in adjustable shaft bearings, and more particularly to a shaft bearing for service particularly in connection wtih the propeller shaft of a boat, more specifically on the outside of the hull in connection with what is known as the strut bearing.

The invention has for another object to provide a self-lubricated, non-scoring bearing in which provision is made for adjustment to compensate for the slack caused by rotation of the shaft.

A further object of the invention is to provide an adjusting and locking arrangement in connection with such a bearing, the adjusting feature being employed to take up slack caused by the rotation of the shaft, and the locking feature being to lock the parts during the use of the bearing to the end that the adjusting device will not accidentally back away from its tightened or adjusted position.

The invention has for a still further object to provide a bearing sleeve in a certain relationship to the cylindrical bearing of a boat hull strut in which the sleeve accommodates heterogeneous packing and bearing rings in contact with the rotating shaft and held tightly in place by a packing gland screw threaded to parts of the sleeve which lie within and without the confines of the strut bearing support; in combination with a lock nut which is also threaded upon the threads of the packing gland nut and has a conical or tapered portion for cooperating with the externally tapered and slotted projecting end portion of the sleeve for the purpose of constricting the sleeve about the abnormally long shank of the packing gland nut, thereby holding the same against rotation.

With the foregoing and other objects in view, the invention will be more fully described hereinafter, and will be more particularly pointed out in the claims appended hereto.

In the drawing, wherein like symbols refer to like or corresponding parts throughout the several views, Figure 1 is a longitudinal section taken through an improved adjustable shaft bearing constructed in accordance with the present invention.

Figure 2 is a vertical transverse section taken on the line 2—2 in Figure 1.

Figure 3 is a similar view taken on the line 3—3 in Figure 1.

Figure 4 is a top plan view of parts of the locking device with the lock nut backed off the tapered and slotted sleeve end.

Referring more particularly to the drawing, 10 designates the external rear hull strut usually found on boats having the bearing support or bore 11 of a cylindrical form through which the boat propeller shaft 26 passes.

The improved shaft bearing constitutes a unit which slips over the shaft 26 and slips within the cylindrical bearing strut bore 11, being held therein by any suitable means, for instance by the set screws 12.

This bearing unit consists generally of a sleeve 13 having an interior diameter which exceeds that of the external diameter of the shaft 26 by a margin consistent with the desirable radial thickness of packing rings 16 and bearing rings 17 which surround the shaft 26 and are confined by the sleeve 13. The sleeve has at one end a bearing end collar 14 which may be in one piece with the sleeve 13 but is preferably coupled thereto as by screw threading and/or by the radial pins 15. The end collar 14 has a smooth bore which engages upon the cylindrical surface of the shaft 26. The function of the collar 14 is to close this end of the packing ring compartment of the sleeve 13. It also functions as a thrust member to receive the axial thrust devolving upon the packing rings 16 and bearing rings 17 by action of the packing gland nut 18, the abnormally long shank 19 of which is adjustable into and out of the opposite end of the bearing sleeve 13. The packing gland nut and its long shaft 19 are smooth-bored internally to slide and rotate upon the cylindrical surface of the shaft 26 and to more or less accurately fit the same. The inner end of the long shank 19 is constructed and arranged and shaped to engage the proximate packing ring, and through such packing ring, to exert an axial pressure all along the line progressively upon all of the subsequent packing rings, urging same to the right as shown in Figure 1 and against the end thrust collar 14.

The long shank 19 throughout substantially its entire length is provided with external screw threads 20 which mate with complemental internal threads upon what may be described as the open end of the sleeve 13. When the packing gland 18 and its long shank 19 are removed so that this end of the sleeve 13 is open, the packing rings 16 and bearing rings 17 may be loaded thereinto in any sufficient number. The packing rings 16 and 17 are preferably of a duplex character in which the rings 16 for instance are non-metallic, preferably flax; while the rings 17 are metallic so called "oilite" rings.

A lock nut 21 has internal screw threads 22 over a portion only of its axial length to mate with the external screw threads 20 on the outer portion of the long barrel or shank 19 of the packing gland nut 18. The remaining inner portion of the lock nut 21 is tapered or frusto conical with the truncated apex of the cone toward the threads 22 and the base of the cone toward the strut. This tapering portion 23 is a smooth cone and it is adapted to ride on a counter part conical or tapered external surface 24 of the open end of the sleeve 13, or rather so much of the open end of such sleeve as lies beyond the strut. This is a part of the open end of the bearing sleeve 13 which is unconfined and unobscured by the strut and over which the conical part 23 of the lock nut 21 has free play incident to the axial motion of the lock nut 21 with reference to the long shank 19 of the packing gland nut 18. This relative axial motion is derived from the relative rotation of the lock nut 21 about the long shank 19.

The conical or tapered projecting end portion of the sleeve 13 is slotted, as indicated at 25. As indicated in Figure 2 four such slots may with advantage be provided, dividing the projecting tapered end of the sleeve 13 into quadrants which may individually and independently move in and out radially as determined by the axial position of the lock nut 21.

During the use of the boat and developing from the long continued and high rotation of the propeller shaft 26, slack occurs in the packing which enables pebbles and other foreign matter to gain access to the bearing with resulting scoring or cutting of the shaft 26. Also the shaft loses its tight bearing support and may be inclined to wobble. Other disadvantages multiply with slackness of the bearing packing. To remedy this situation the packing gland nut 18 may be rotated with reference to the sleeve 13 to cause the long shank 19 to progress into the sleeve, forcing the heterogeneous packing rings before it and individually causing their radial expansion to crowd both the sleeve 13 and the shaft 26. In other words the packing ring 16 and bearing rings 17 are compressed between the end thrust collar 14 and the shank of the packing gland nut. This tightening may take place from time to time. After each tightening adjustment the lock nut 21 is rotated on the long shank 19 in a direction to cause the lock nut to progress axially along the conical end 24 of the sleeve. With the two cone surfaces 23 and 24 riding together, the unsupported outwardly projecting slotted end of the sleeve 13, which has been also weakened by the taper 24, will be driven in or compressed against the external part of the shank 19 to bind the sleeve and the packing gland nut against any further relative rotation which might result in the casual or accidental retrograde rotation of the nut 18 partly or wholly out of the sleeve 13. This locking arrangement is enhanced by reason of the fact that the two faces of the compressed members are screw threaded at 20.

The invention is also applicable generally to machinery shafts, particularly when operating under wet conditions or submerged in liquids.

The packing and bearing rings are easy to install and adjust. The flexible packing rings 16 may be saturated with lubricant or an oil or both and the metallic bearing rings are oil impregnated to provide self-lubricating bearings. The metallic bearing rings 17 having superior hardness and less compressibility than the flax packing ring 16, the bearing rings 17 will act in the capacity of plungers or pistons to expand the flax packing rings. The rings of differential material may alternate in the packing box, but preferably two or three of the flax or non-metallic rings 16 are placed together and separated by a single metallic ring. This combination seals the shaft from foreign matter and prevents scoring of the shaft.

It will be noted that the internal threads 20 at the threaded or open end of the sleeve 13 progress from the outermost end of the sleeve to a point inwardly which is spaced well within the strut bearing. In other words substantial axial distances or zones at the open end of sleeve 13 participate in the continuous threads 20. In this way the protection, reinforcement and backing given the sleeve 13 by the strut bearing 11 are utilized to take up radial thrust of the packing nut gland developed through the sleeve 13, and the entire strut-confined threaded portion of the sleeve 13 reinforces and strengthens the weaker outwardly projecting portion of the sleeve which is weakened both by slotting and by progressively diminishing thickness and mass as well as by a lack of support of the strut bearing which must terminate short of the cone 24 to enable the companion cone 23 to function in relation thereto. The slots 25 may be of course in any number.

By backing off the lock nut 21 the elasticity inherent in the metallic sleeve 13 will cause the segments between the slots 25 to expand radially outward away from the long shank 19 and enable the gland nut 18 to be rotated further into the sleeve 13 with consequent adjustment and tightening of the packing elements. After adjustment the lock nut 21 is again rotated to cause constriction of the segments upon the long shank 19.

It is obvious that various changes and modifications may be made in the details of construction and design of the above specifically described embodiment of this invention without departing from the spirit thereof, such changes and modifications being restricted only by the scope of the following claims.

What is claimed is:

1. In an adjustable strut shaft bearing, a sleeve closed at one and open at its other end, said open end having axially running angularly displaced slots extending through the free end of the sleeve, packing material in the sleeve, a packing gland movable on the material through the open end of the sleeve, and means to compress the slotted end of the sleeve on said gland.

2. In an adjustable strut shaft bearing, a sleeve having an internal diameter greater than the external diameter of the shaft to provide a stuffing box, metallic bearing rings and non-metallic packing rings in said box surrounding the shaft, a thrust collar closing one end of said sleeve against which the packing abuts, the other end of said sleeve being open and internally threaded, a packing gland nut having a smooth bore rotatable and axially slidable on the shaft and having an abnormally long shank with external threads throughout substantially its entire length fitting adjustably in the open end of said sleeve and having its inner end constructed and arranged and shaped to engage against the packing, a lock nut having a portion threaded on the exposed part of the packing nut shank, said lock nut and adjacent open end portion of said sleeve having mating conic sections to cause the sleeve end to be constricted on said shank when the lock nut is advanced on the threads of the shank.

3. A bearing as claimed in claim 2, in which the sleeve is longer than the strut bearing, means to so confine the sleeve in the strut bearing that a substantial length of the open end of the sleeve protrudes outwardly beyond the confines of the strut bearing, said protruding sleeve end being divided into independently movable segments by slots extending through the conic section of the sleeve end, the internal threads of the sleeve progressing from the outer extremity thereof to a point substantially within the strut bearing.

GUSTAVE WALTER.